United States Patent [19]

Bolliger

[11] 4,111,033

[45] Sep. 5, 1978

[54] ASSEMBLY FOR TESTING SHOCK ABSORBERS INCORPORATED IN VEHICLES

[76] Inventor: Alfred R. Bolliger, Im Sidefädeli 4, 8803 Rüschlikon, Switzerland

[21] Appl. No.: 816,665

[22] Filed: Jul. 18, 1977

[30] Foreign Application Priority Data

Jul. 19, 1976 [CH] Switzerland .......................... 9191/76
Jul. 3, 1977 [CH] Switzerland .......................... 8123/77

[51] Int. Cl.² .......................................... G01M 17/04
[52] U.S. Cl. ........................................................ 73/11
[58] Field of Search ...................... 73/11, 12, 669, 655

[56] References Cited

U.S. PATENT DOCUMENTS

| 2,455,532 | 12/1948 | Sunstein | 73/655 |
|---|---|---|---|
| 3,105,381 | 10/1963 | Collette | 73/655 |
| 3,159,024 | 12/1964 | Tsien | 73/655 |
| 3,164,003 | 1/1965 | MacMillan | 73/11 |
| 3,792,604 | 2/1974 | Fader et al. | 73/11 |
| 3,939,692 | 2/1976 | Bolliger | 73/11 |

*Primary Examiner*—Anthony V. Ciarlante
*Attorney, Agent, or Firm*—Cushman, Darby & Cushman

[57] ABSTRACT

The invention relates to an assembly for checking shock absorbers incorporated in vehicles by evaluating the oscillations of body components relative to the wheels and wheel axles upon sudden lowering of a wheel support device. A light beam is described as being interrupted by an element to provide a signal as a measure of the oscillations. The wheel support device is exemplified as being hydraulically liftable with rack and pinion means being provided for ensuring equal lifting of wheels at either end of an axle.

12 Claims, 8 Drawing Figures

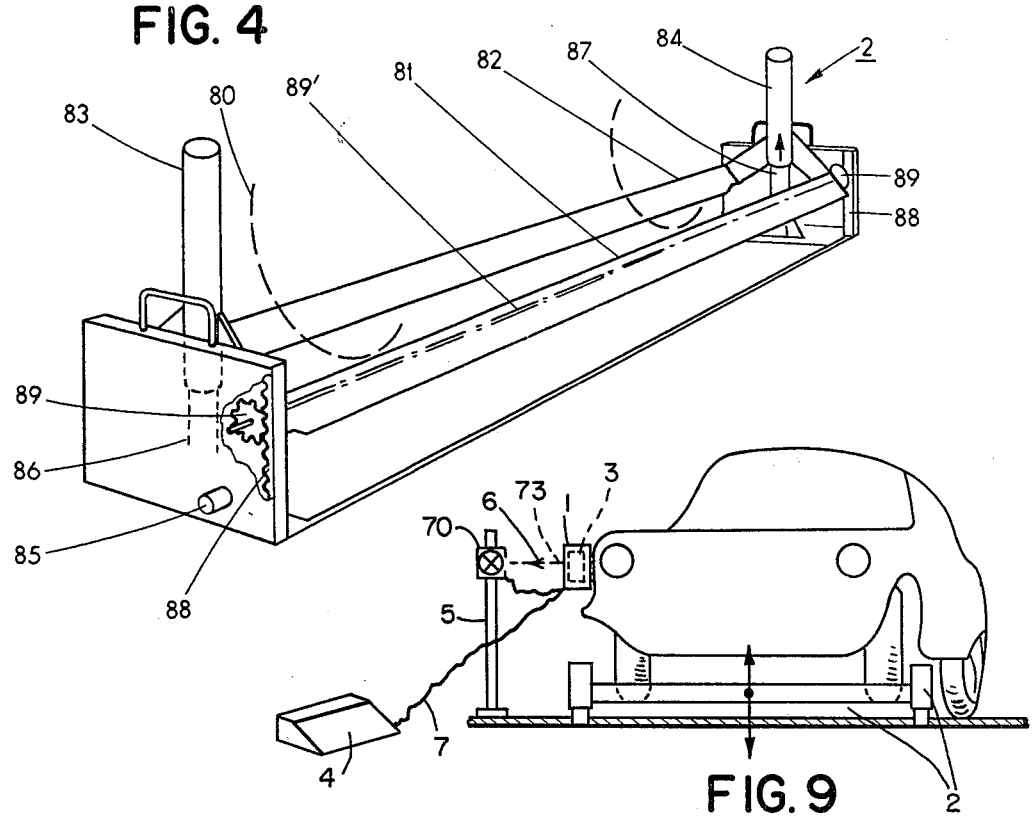
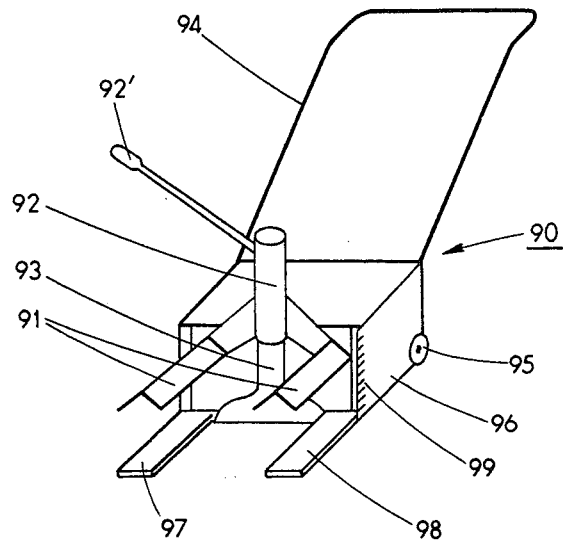

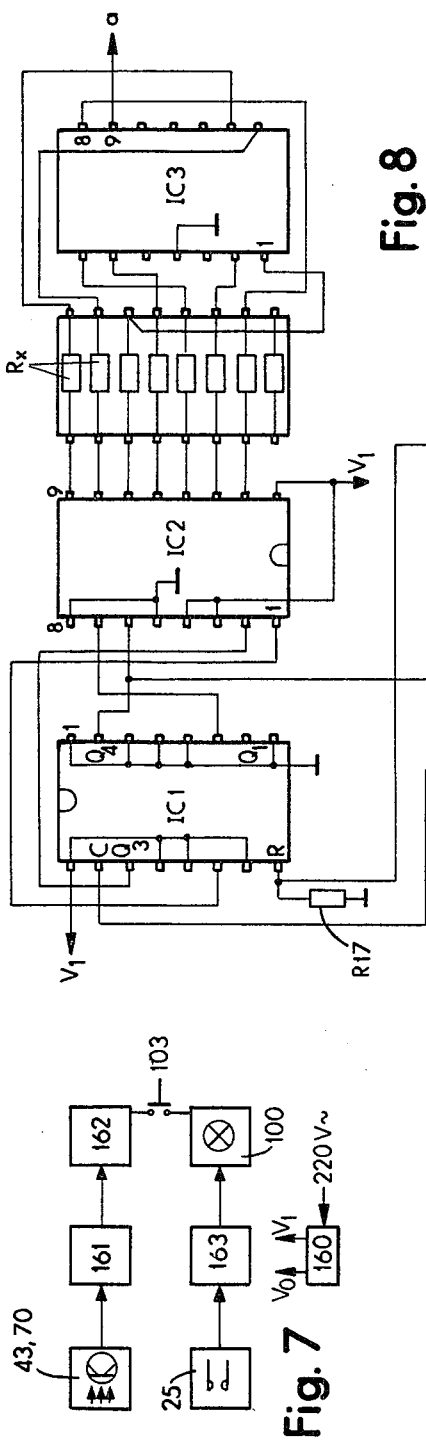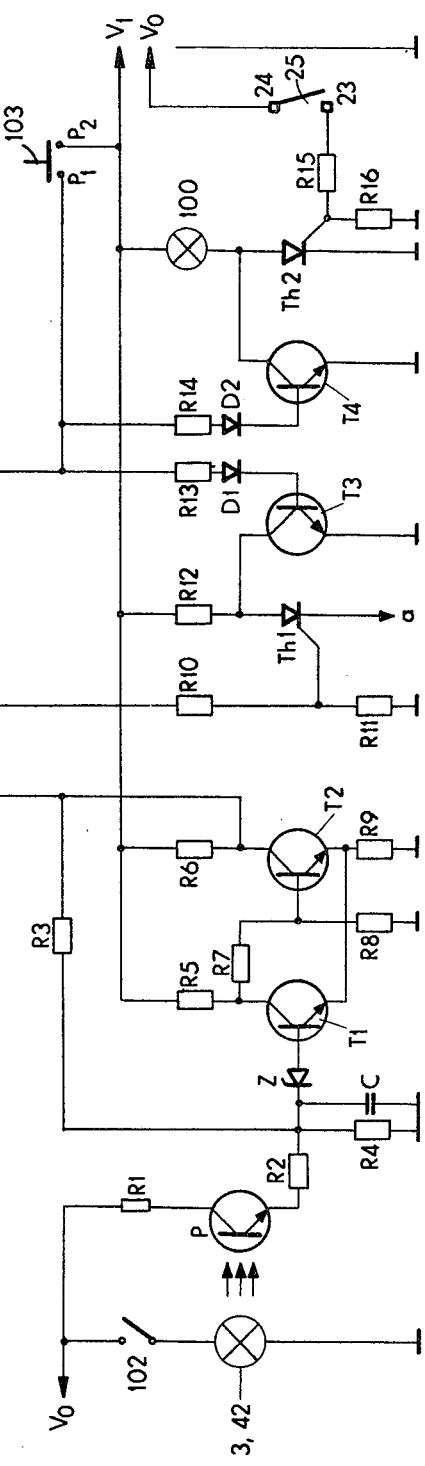
Fig. 7
Fig. 8

ASSEMBLY FOR TESTING SHOCK ABSORBERS INCORPORATED IN VEHICLES

This invention relates to an assembly for testing shock absorbers incorporated in vehicles.

The present invention in particular relates to improvements in the invention disclosed in my prior main U.S. Pat. No. 3,939,692 issued Feb. 24, 1976 the disclosure of which is hereby incorporated by way of reference.

The main patent relates to equipment for testing shock absorbers built into sprung vehicles, especially into cars, by evaluating the vibrations of parts of the bodywork relative to the ground as a result of a falling motion of a pair of wheels of the vehicle. The equipment includes at least one instrument containing a means for fixing the same to the parts of the bodywork in the vicinity of the shock absorber to be tested, means for measuring the acceleration imparted to the instrument after the falling motion, a device, having an adjustable response threshold, actuated by these means, and a device for indicating that the response threshold has been exceeded.

As already explained in the main patent, the equipment evaluates the acceleration which is imparted to the parts of the bodywork in the rebound after the wheels have dropped over a step. In this connection, an instrument in which the means for determining the acceleration contains an inertial body or projectile and an electrical contact arrangement which is actuated by the projectile in the case of poor shock absorbers and hence triggers a "poor" indication on the indicator, has proved particularly advantageous. This equipment of the main patent has in particular proved of value in the detection of so-called "knocking" shock absorbers and of play in the suspension. The term "knocking" shock absorbers is applied to those having a hesitant or brusquely terminating damping sequence, causing knocks and shocks, which phenomena may be due to worn-out shock absorber rubbers, loose screws, bent piston rods and other defects.

Shock absorber defects which merely result in excessive subsequent rocking of the parts of the bodywork, without pronounced acceleration, are in principle also detectable but would require greater sensitivity of the equipment or more extensive means of adjustment. Such severe bodywork vibrations without significant accelerations are encountered with soft, inefficient or completely ineffective shock absorbers, and with defective shock absorber valves.

It is an object of the present invention to develop the equipment of the main patent so that it is suitable not only for assessing the acceleration of the parts of the bodywork but also for assessing the course of the vibrations and is hence able to provide information on the degree of softness of the shock absorbers. In addition, the equipment is intended to provide information as to whether a wheel suspension which no longer gives free play may be present, possibly due to seized-up bearing bushes or jamming shock absorber piston rods.

According to the invention, this object is achieved if the step is constructed as a lifting device and a cooperating light emitter/light receiver pair is provided, together with an element located in the path of the beam of the said pair, which element can periodically be passed by the light beam, and of the three components, namely light emitter, light receiver and element, at least one and at most two components are rigidly mounted on the instrument, and the light receiver is electrically connected to the indicator equipment.

The invention is explained in more detail by way of example, with reference to the accompanying drawings. In these:

FIG. 1 schematically shows the individual components of a first illustrative embodiment of the equipment;

FIG. 4 shows, by way of example, a lifting device of the equipment for a pair of wheels;

FIG. 5 shows, by way of example, a lifting device of the equipment for a single wheel;

FIG. 7 shows a a simplified block circuit diagram of the construction of the circuit of the indicator unit according to FIG. 6;

FIG. 8 shows, by way of example, a schematic circuit of the indicator unit according to the block circuit diagram of FIG. 7; and FIG. 9 schematically shows a second illustrative embodiment of the equipment.

Figure 1:
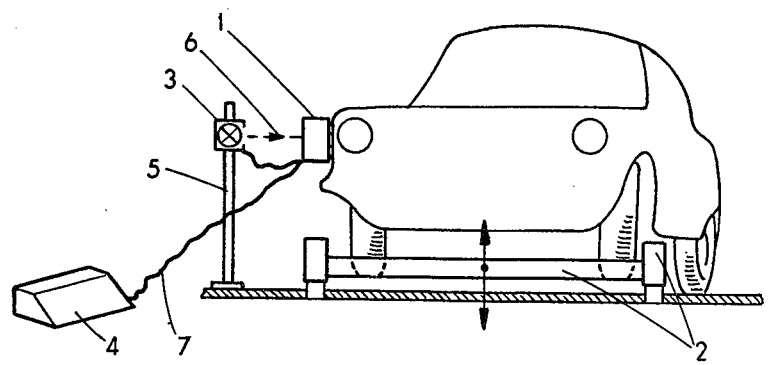

In FIG. 1, the individual components of an illustrative embodiment of the equipment are shown in a simplified form. The step 2 is here constructed as a hydraulic lifting device, which allows selectable lifts or drop distances to be set for each pair of wheels. The equipment further comprises the instrument 1, which is advantageously fixed to the wing, the stationary light emitter 3 and an indicator unit 4. In FIG. 1, only the equipment for testing the shock absorber on the right-hand side is shown though, of course, in practice a corresponding instrument 1 is additionally fitted on the left-hand side wing, so that it is possible simultaneously to test the two shock absorbers of an axle.

The above configuration, with a light emitter 3 which is located outside the instrument 1, is described in more detail later in relation to FIG. 3. In the text which follows, the illustrative embodiment according to FIG. 2 will first be explained, in which the light emitter is accommodated in the instrument.

Figure 2:
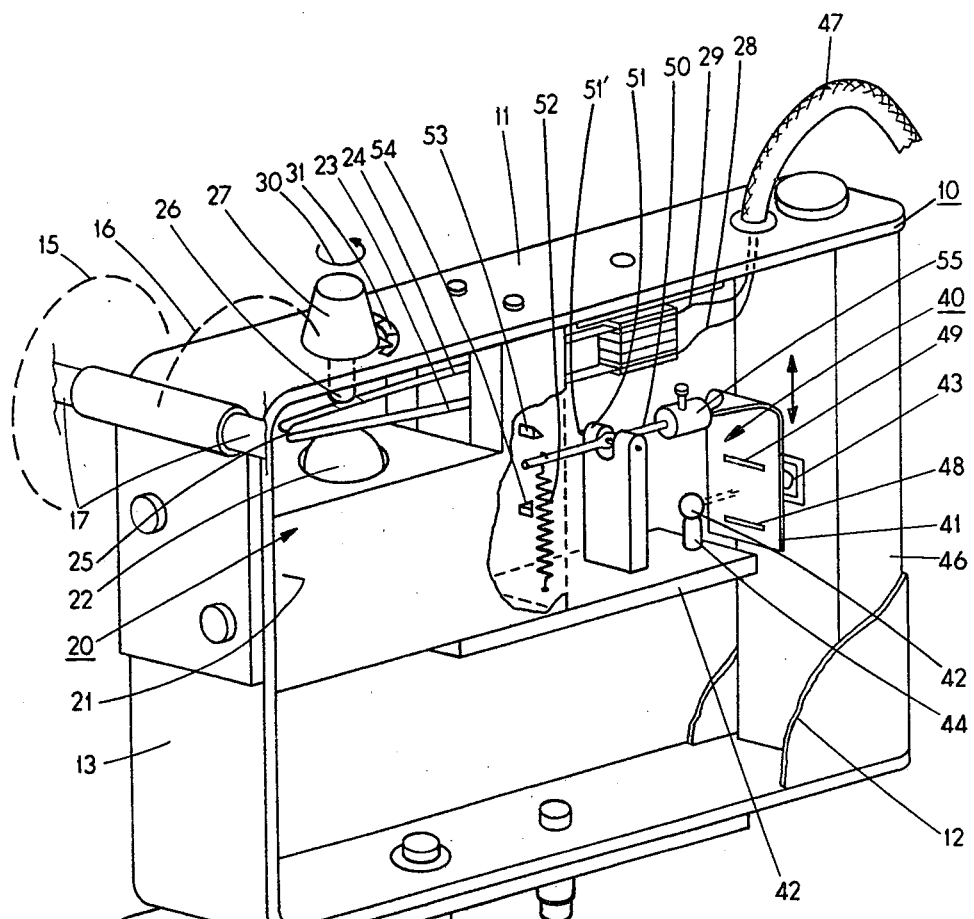
FIG. 2 shows, in perspective and cut-open view, an instrument of a second illustrative embodiment of the equipment.

The approximately hand-sized instrument 10 according to FIG. 2 corresponds, in its individual components, to the instrument of my now U.S. Pat. No. 3,939,692 and these components will therefore only be explained briefly. The housing consists of the flat, square frame 11 and of a correspondingly flat U-shaped hood 12 which can be pushed over the frame 11 from behind. On the front vertical side 13 of the frame 11 there is a lower suction pad 14 and two upper suction pads 15,16, the latter being shown merely in broken lines for simplicity of representation. The instrument can be attached, in a vertical orientation, to bodywork parts of any desired shape, in the region of the shock absorbers, by means of the suction pads 14–16 of rubbery-elastic material. For this purpose, the upper suction pads 15,16 are fixed to the rotatable shaft 17 and the lower suction pad 14 is fixed to the bracket 19 which can undergo sliding adjustment and can be fixed in position by means of the screw 18.

The acceleration measuring device 20 which serves to determine "knocking" shock absorber defects of the nature described above is constructed as a projectile device and is explained in detail in the main patent. The projectile device 20 consists of the container 21, in which is mounted, with its tip projecting from the container 21, the ball 22 which acts as a projectile, the superposed electrically insulated metallic springs 23 and 24, which form a contact gap 25 at their tip, and the adjustment screw 26 of the adjustment head 27, which screw engages on the upper spring 24 and serves to adjust the width of the contact gap 25. The springs 23,24 are connected by electrical leads 28,29 to the indicator unit 4 (compare FIG. 6) and are there connected to a source of DC voltage. In addition, in a manner still to be shown, a signal lamp 100 of the indicator unit 4 is present in the circuit which contains the source of voltage and the springs 23 and 24.

In accordance with the mode of operation explained in the main patent, the projectile device 20 utilises the fact that its ball 22, under conditions of knocking damping or rapid acceleration, executes a vertical inertia movement upwards, and is thereby able to close the contact gap 25, which is indicated by the signal lamp 100 lighting up. The width of the contact gap 25 which is overcome is in this case a measure of the intensity of the knock or of the acceleration. Next to the setting knob 27 there is a scale 31 appropriate to the gap widths and calibrated in shock absorber qualities. If the direction of rotation 30 of the setting knob 27 increases the gap width, the scale 31 can, for example, be subdivided into three zones, which in the anti-clockwise direction denote the tolerance range, light knocking and hard knocking.

According to the invention, the equipment is constructed so that during the knocking test described above a vibration test is carried out as part of the same process and the results thereof are evaluated in the indicator instrument 4. For this purpose, the equipment hereafter referred to as the vibration tester 40 is additionally provided in the instrument 10. The vibration test is based on inertia effects which are encountered on elements capable of vibration if the instrument 10 executes the vibrations of the part of the bodywork to which it is attached. The vibration tester 40 consists, in the present case, of a photoelectric barrier which is rigidly fixed in the instrument 10 and thus co-executes the vibrations of the bodywork, a wall-shaped screen 41 being located, as an inertia element capable of vibration, in the beam of the photoelectric barrier. The latter consists of the light emitter 42 constructed as a bulb, of which the holder 44 is held on the horizontal carrier 45, and of the light receiver 43, advantageously based on a semiconductor. The light receiver 43 is, in the present case, recessed into the rear vertical support 46 of the frame 11, so that no significant light from the environment falls on the receiver 43. If required, the receiver 43 can also be accommodated in a projecting screening tube. The emitter 42 and the receiver 43 are connected to pairs of leads which are not shown, but which lead through the cable 47 into the indicator unit 4 and are there advantageously connected to the abovementioned source of voltage.

In the instrument 10, the path of the beam is oriented horizontally, parallel to the frame 11, and is thus at right angles to the bodywork vibration. Furthermore, in the rest position of the instrument 10, the beam falls at right angles onto the screen 41 which interrupts the beam and which possesses horizontal slits 49 and 48 respectively above and below the point at which the beam impinges. The screen 41 is suspended so that it is capable of vibration, in order to execute an inertia vibration in the vertical direction. The suspension consists, in the present case, of the rod-shaped balance beam 50 which is attached to the top of the screen 41, and which projects through a support 51, in which it is mounted so as to be able to pivot about a horizontal axis 51' at right angles to the path of the beam. A spring 52, supported on the carrier 45, engages on the end of the balance beam 50. Furthermore, an upper and lower stop 53 and 54, which limit the swing of the balance beam 50 at the rear end, are provided on the housing 21. The spring 52 is so chosen that in the rest position of the instrument 10 it holds the beam 50 in equilibrium or in the horizontal position. The magnitude of the vibrating inertia mass is advantageously determined essentially by the weight 55 which is located in front of the screen 41 on the beam 50 in a slideable and lockable manner.

When the bodywork for the first time is caught (? by the shock absorbers) after the wheel or pair of wheels has fallen from a certain height, the instrument 10 first jerks downwards. For inertia reasons, the screen 41 at the same time executes an upward movement relative to the instrument 10. Given suitable dimensioning of all components of the vibration tester 40, it is under these circumstances possibile to achieve a situation where the lower slit 48 passes the path of the beam and thereby triggers a pulse in the receiver 43. Conversely, when the instrument 10 subsequently jerks upwards, the screen 41 is retarded relative to the instrument, so that the slits 48 and 49 successively pass the photoelectric barrier and trigger pulses. Corresponding remarks apply to the further vibrations of the instrument 10. The number of passes of the beam through the slit is shown in the single-digit counter-indicator 101 of the evaluation unit 4. The number of pulses provides information on the vibration and rocking behaviour of the shock absorber and can be calibrated in various degrees of softness, for example good-soft-defective. Furthermore, too few pulses, for example a single pulse, indicates that the wheel suspension no longer has free play or that the springing is hard. If appropriate, the screen 41 can also possess only one, or more than two, slits, or may have bored holes instead of slits.

Figure 3:
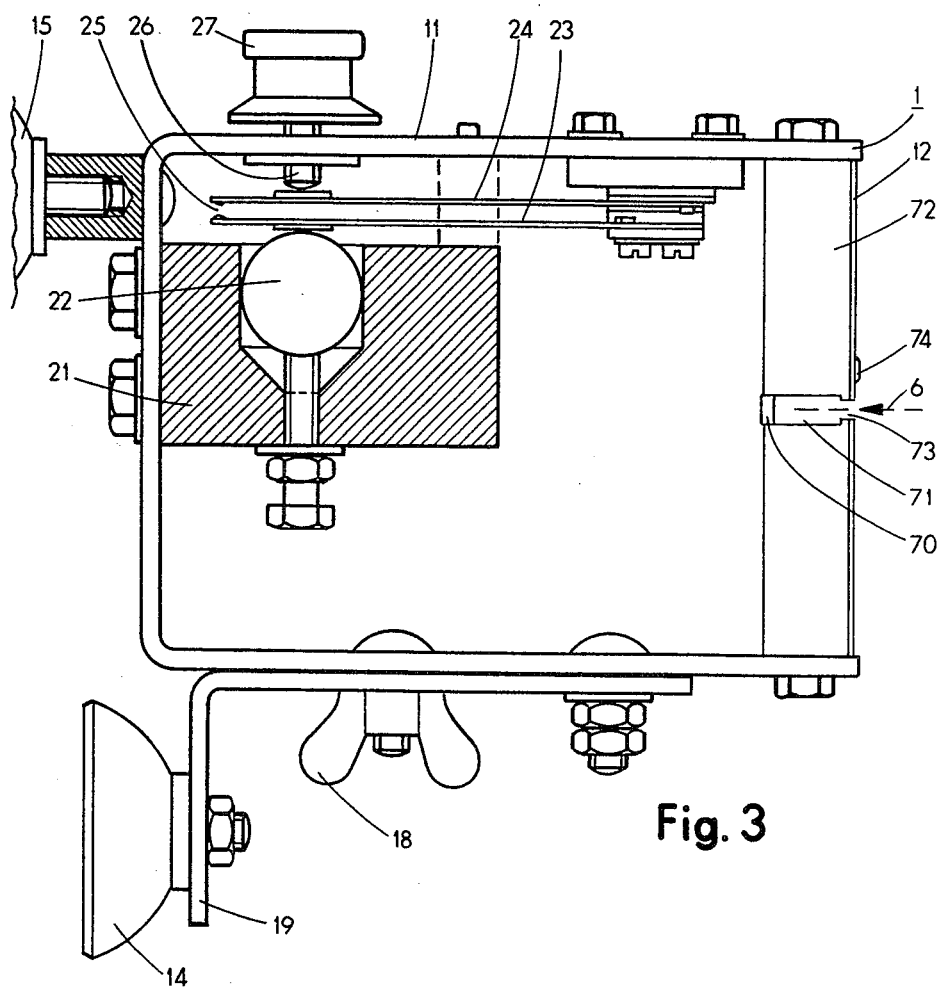
FIG. 3 shows a simplified section through the instrument of the first illustrative embodiment according to FIG. 1.

The illustrative embodiment of the equipment according to FIGS. 1 and 3 differs from the preceding illustrative embodiment in respect of a modified construction of the vibration tester. On the other hand, the projectile device 20 and the frame 11 are unchanged in FIG. 3, for which reason a repeated explanation is superfluous and the same reference numbers will be used for these items. The vibration tester comprises, according to FIG. 1, the stationary light emitter 3, constructed as a bulb, which is adjustably fixed to the stand 5. The light emitter 3 emits the horizontal light beam 6, which, during the vibration test, serves as the reference level for the instrument 1 which vibrates up and down. The semiconductor-based light receiver 70 is present recessed in the bore 71 of the rear support 72 of the instrument 1, a diaphragm 73 advantageously being present at the bore entry. The emitter 3 and receiver 70 are connected to the indicator unit 4 by means of leads 7. The vibration test is advantageously carried out by first driving the vehicle to be tested onto the non-actuated lifting device 2. The light emitter 3 on the stand 5 is then so adjusted that its light beam 6 is directed onto the mark 74 above the diaphragm 73. After lifting up the vehicle and triggering the dropping motion, the instrument 1 initially executes a downward motion relative to the light beam 6, which is followed by a damped vibration. As can be seen, each time the beam 6 passes through the diaphragm 73 a pulse is generated in the light receiver 70, and this pulse passes into the indicator instrument 4 and is evaluated and counted there; advantageously, the number of pulses can be read off on a numerical digital indicator 101. For example, the equipment can be so designed in respect of lifting stroke, mark 74 and type of vehicle, and calibrated in degrees of softness, that a counter reading of 2-3 means good, 4-5 means soft and 6-9 means defective. Accordingly, the above vibration tester determines the vibration and rocking behaviour of the shock absorbers by photoelectrically sensing the bodywork vibration, without using an inertia effect on vibratable elements. In addition to revealing the vibration behaviour, the vibration tester also reveals defective play of the wheel suspension, that is to say, if, for example, the counter merely indicates "1" or if, after the bodywork vibration has ceased, the mark 74 comes to rest below the light beam 6.

Alternatively, as shown in FIG. 9, the light receiver 70 can be stationary and the light source 3 with a shielding element can be mounted for movement with the instrument 1 attached to the vehicle body.

As can be seen, the equipment according to the invention fitted with a projectile device 20 and a vibration tester 40, or 3, 6, 70 have the particular advantage that by means of these the knocking and vibration behaviour of the shock absorbers and the wheel suspension can be tested in a measurable manner simultaneously in one operation.

FIG. 4 illustrates an embodiment of a lifting device 2 for a pair of wheels. The essential feature of this is that it lifts a pair of wheels in a fixed location, that is to say without simultaneous forward movement of the vehicle, which is why the lifting device 2 is preferentially suitable for use in a test employing the equipment according to FIGS. 1 and 3. Furthermore, the lifting fevice 2 is constructed so as to produce identical and reproducible drop distances of the individual wheels of a particular pair of wheels. In the lifting device 2, the pair of wheels 80 shown in broken lines rest on the two parallel support rails 81 and 82. At each of their two ends, the support rails 81 and 82 are rigidly connected to a hydraulic cylinder 83 and 84 respectively. The hydraulic cylinders 83 and 84, when supplied with pressure oil via the feed 85, can slide telescopically relative to the stationary piston stands 86 and 87. In order to ensure identical strokes and drop distances on both sides, the ends of the support rails 81 and 82 are guided. These guides consist, for each rail end, of a vertical stationary rack 88 and a pinion 89 rolling thereon. The pinions 89 provided on either side of each support rail 81 and 82 are rigidly connected to one another by the shaft 89' shown in broken lines. The distance that a pinion 89 rolls (on the rack) on one side of the rail accordingly manifests itself inescapably also on the other side of the rail, independently of any possible unequal application of pressure to the hydraulic cylinders 83 and 84. As a result of the identical drop distances resulting therefrom, a comparison of the digital indication on the indicator unit 4 immediately shows whether the left and right shock absorbers work equivalently.

FIG. 5 illustrates a suitable lifting device 90 for an individual wheel. In order that a test sequence can be repeated as often as desired under identical conditions, the use of this lifting device is more advantageous than the use of a step which after each test necessitates pushing the vehicle forward. The lifting device 90 possesses a support fork 91, which can be brought up to the wheel from the side and placed against the wheel from below. The fork 91 is replaceably fixed to the hydraulic cylinder 92, which cooperates with the piston stand 93. The cylinder 92 and stand 93 are located on the instrument box 96 which is provided with a steering handle 94 and wheels 95. Below the prongs of the fork extend the stand rails 97 and 98 respectively, which are fixed to the box 96. The lifting stroke of the fork can be actuated by, say, the lever 92' which engages on the cylinder 92, or by a hydraulic pump. The lifting device 90 furthermore possesses means, which are not shown, for disengaging the raised support fork 91. In order to be able to set identical drop distances for different sizes of wheel, a scale 99, on which the distance between the ground and the bottom point of the wheel can be read off is present on the box 96. For extremely small wheels, the fork 91 can be replaced.

Figure 6:
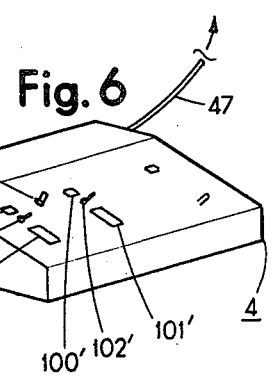
FIG. 6 shows a simplified view of an indicator unit for the instruments according to FIGS. 2 and 3.

FIG. 6 shows an indicator unit 4 which is suitable for evaluating and indicating the signals for both instruments 1 and 10, according to FIGS. 3 and 2 respectively. In addition to the indicator lamp 100 for the knock test and the counter indicator 101 for the vibration test, the indicator unit 4 contains a shared reset pushbutton 103 for deleting all indications. Furthermore, it is advantageous to provide a switch 102 for switching on the light emitter 3 or 42 after the instrument 1 or 10 has been fixed to the bodywork. Since the equipment according to the invention can contain either one or two identical instruments 1 or 10 for testing shock absorbers individually or in pairs, a second identical indicator assembly 100', 101' and 102' is present in the indicator unit 4.

As can be seen, the equipment according to the invention is not restricted to the illustrative embodiments described, and instead can be modified in numerous ways. For example, in FIGS. 1 and 3 the light emitter 3 can be present in the instrument 1, whilst the light receiver 70 is located outside the latter. In particular, numerous solutions are feasible for testing the vibration behaviour of shock absorbers, if this test is based on inertia effects, as in the illustrative embodiment according to FIG. 2. Thus, the suspension for the screen 41 can be of different design to that using the balance beam 50, for example a design using springs which engage at the top and bottom of the screen 41. A beam suspended in the manner of a swing, without support from underneath, is also conceivable. Instead of the screen, other elements which interrupt the path of the beam at least periodically may be used, for example a spring clamped at one end, the tongue of the spring forming the element. A design in which the interruption of the path of the beam is indicated as a pulse is also feasible. It is furthermore within the scope of the invention to suspend the light emitter so that it can vibrate and to fix the element which causes the interruption, and the light receiver respectively, rigidly in the instrument. Furthermore, the photoelectric barrier as an entirety may be capable of vibration whilst the interrupting element is static. It is furthermore within the scope of the invention to integrate some or all components of the indicator unit 4 into the instrument 1, 10 or locate them in the said instrument.

A suitable circuit arrangement of the indicator unit 4 for evaluating the signals triggered in the instrument 1, 10 is explained below, in relation to FIGS. 7 and 8. Since the electronics for a second instrument which can be connected up are identical to those of the first-mentioned instrument, they do not require explanation. According to the block circuit diagram of FIG. 7, the indicator unit 4 contains a mains section 160, which provides an unstabilised and stabilised DC voltage $V_o$ and $V_1$ respectively and which is not discussed in more detail. The pulses arriving from the light receiver 43, 70 pass into a first electronic evaluation system 161 and from there to the counter 162. The electronic evaluation system 161 converts the pulses which enter into suitable signals for processing in the counter 162. In a second branch, the contact gap 25 is connected to the indicator lamp 100 via a second electronic evaluation system 163. The electronic evaluation system 163 causes the lamp 100 to remain on after contact has been made briefly. In addition, a reset device 103 for the shared cancelling of the indication of the lamp 100 and counter 162 is provided.

According to FIG. 8, and the parts list which follows, the light receiver 43 or 70 is constructed as a phototransistor P. The phototransistor P is connected to the unstabilised voltage $V_o$ via the resistance R1 and is connected, on the output side, via the resistance R2 and the Zener diode Z to the base of the transistor T1. The transistors T1 and T2 together form a Schmitt trigger which is wired to the resistors R3 to R9 and the capacitor C. T1 blocks, and T2 conducts, as long as no photocurrent flows. If, on the other hand, one of the slits 48 and 49 or the diaphragm 73 passes through the path of the beam in the manner previously described, the positive pulse initiated in the phototransistor P causes the trigger to trip and T1 conduct, whilst T2 blocks. The rectangular signals of suitable steepness of the flanks, which are received at the collector of T2 pass into the counting input C of the BCD counter IC1. The counter IC1 together with the decoder IC2 and the 7-segment indicator IC3 form a single-digit counter of known circuitry and no further explanation is required. The counter permits the recording of more than nine passes of the slit, in that when the counter shows 8, the decimal point lights up, and continues as a reminder mark in the segment indicator IC3, whilst the indicator IC3 shows the numerical sequence 8, 9, 0, 1 . . . This is achieved by the thyristor Th1, which is controlled by the output $Q_4$ of the counter IC1 and is located on the decimal point connection 9 of the segment indicator IC3.

The contact gap 25 is connected in series with the voltage source $V_o$ and the resistance R15 to the control electrode of the thyristor Th2, the anode of which is connected to the voltage $V_1$ via the indicator lamp 100. The thyristor Th2 strikes if a brief contact is made and, when the contact gap 25 is open again, the thyristor maintains the current through the lamp 100. In parallel to the thyristors Th1 and Th2 are the transistors T3 and T4, which block if the reset pushbutton 103 has not been actuated, and the collectors of which are connected via the diodes D1 and D2 and resistors R13 and R14 to one pole $P_1$ of the reset pushbutton 103, of which the other pole $P_2$ is connected to $V_1$. Furthermore, the pole $P_1$ is connected via the diode D3 to the reset connection R of the counter IC1. Brief actuation of the reset pushbutton 103 cancels all indications of the lamp 100 and the segment indicator IC3 because of the short-circuited thyristors Th1 and Th2 and the high value of the reset connection R.

Suitable components for the circuitry are listed below:

| | | | |
|---|---|---|---|
| Phototransistor | P | | N2 5777 |
| Transistors | T1-T4 | | BC 237 B |
| Counter | IC1 | | MC 14510 CP |
| Decoder | IC2 | | MC 14511 CP |
| Thyristors | Th1,2 | | BRX 44 |
| Zener Diode | Z | | 3.3 V |
| Capacitor | C | | 33nF |
| Resistances | R1 | 1 | k.ohm |
| | R2 | 22 | k.ohm |
| | R3 | 220 | k.ohm |
| | R4 | 22 | k.ohm |
| | R5 | 4.7 | k.ohm |
| | R6 | 4.7 | k.ohm |
| | R7 | 22 | k.ohm |
| | R8 | 22 | k.ohm |
| | R9 | 470 | k.ohm |
| | R10 | 10 | k.ohm |
| | R11 | 1 | k.ohm |
| | R12 | 1 | k.ohm |
| | R13 | 10 | k.ohm |
| | R14 | 10 | k.ohm |
| | R15 | 10 | k.ohm |
| | R16 | 1 | k.ohm |
| | R17 | 4.7 | k.ohm |
| | $R_x$ | 10 | k.ohm |
| Voltages | $V_o = 12$ V | | |
| | $V_1 = 8\ V_{stab}$ | | |

I claim:

1. An assembly for testing a shock absorber associated with a wheel pair of a spring suspended vehicle having a vehicle body, said assembly comprising
   a. a lifting device for producing a drop motion of at least one wheel so that the vehicle body will rise in oscillation under the influence of springs but damped by a shock absorber after dropping motion thereof, and
   b. means for indicating the condition of a shock absorber of said wheel by simultaneously evaluating the acceleration inherent in the rise of the vehicle body during the first oscillation of the vehicle body and by evaluating the vibrations of the vehicle body after dropping motion thereof, so that both knocking and vibration behavior of said shock absorber are determined by a single drop of said wheel; said indicating means comprising
   i. means for sensing the acceleration of the vehicle body during the rise thereof, said means including an inertia body member which is freely mounted for vertical movement in a vertical path,
   ii. mounting means for mounting said sensing means to a body component of the vehicle body in the vicinity of a shock absorber to test it, said means including a sensing means housing,
   iii. means extending into the vertical path of movement of the inertia body member for generating a signal upon movement of the body member in the vertical path more than a predetermined amount.
   iv. an indicating device responsive to the signal generated by said signal generating means for indicating movement more than said predetermined amount by said body member, and
   v. light beam oscillating sensing means comprising a light emitter element, a light receiver element, and a shielding element located in the path of the beam between said light emitter element and light receiver element, at least one and not more than two of the emitter, the receiver and the shielding elements being rigidly mounted to said housing, the light receiver being electrically connected to the indicating device whereby during oscillation of the sensing means housing with the vehicle body the light receiver element intermittently receives light from the light emitter element and provides a resultant signal to the indicating device.

2. An assembly according to claim 1, wherein the light emitter element is stationary and spaced from the sensing means housing, the light receiver element is mounted for movement with the said housing, and the shielding element comprises a diaphragm rigidly fixed for movement with the housing whereby upon oscillation of the housing the light receiver element periodically receives light from the fixed light emitter element.

3. An assembly according to claim 1, wherein the light receiver element is spaced from the sensing means housing and arranged to be stationary during oscillation of the vehicle body, both the light emitter element and the shielding element being mounted for movement with the sensing means housing whereby the beam is periodically directed at the light receiver element during oscillation of the vehicle body.

4. An assembly according to claim 1, wherein the light emitter element and the light receiver element are both mounted for movement with the sensing means housing, said shielding element being mounted for movement relative to the light emitter element and light receiver element so as to be capable of executing an inertia vibration relative thereto during oscillation of the vehicle body.

5. An assembly according to claim 4, wherein the shielding element is provided with at least one orifice therethrough through which the light beam from the emitter element to the receiver element can pass periodically during oscillatory movement of the shielding element relative to the light beam.

6. An assembly according to claim 4, wherein the shielding element is mounted for vibrational movement in a vertical direction and has positions in which it does not interfere with the path of the beam from the light emitter element to the light receiver element.

7. An assembly according to claim 4, wherein the emitter element and receiver element are arranged to provide the beam horizontally within said housing for the sensing means, the assembly including a suspension supporting the shielding element for vibration in a path perpendicular to the path of the beam.

8. An assembly according to claim 7, wherein the shielding element is a screen, there being included a balance beam pivotally supported in said housing, said screen being fixed to the balance beam.

9. An assembly according to claim 8, wherein means are provided for adjusting the balance of the balance beam and screen supported thereby.

10. An assembly according to claim 1, wherein the lifting device is a hydraulic lifting device comprising two parallel support rails for a pair of vehicle wheels, the rails having opposite ends, means for supporting the rails comprising a cylinder piston unit, and a guide for each of the ends of the support rails, the ends of the rails each being connected to the displaceable part of the cylinder piston unit.

11. An assembly according to claim 10, wherein the guide for each end of each rail comprises a stationary rack and a pinion engaged with the rack, there being provided a shaft connecting the pinions at each end of each rail for co-rotation.

12. An assembly according to claim 1 wherein the lifting device comprises a hydraulic-pneumatic lifting device for a single wheel provided with a support fork which can be applied laterally below the wheel.

* * * * *